United States Patent [19]
Warren

[11] 3,791,755
[45] Feb. 12, 1974

[54] ADJUSTABLE DRILL ON ATTACHABLE BASE

[75] Inventor: Wesley S. Warren, Bloomfield Hills, Mich.

[73] Assignee: General Automation Manufacturing, Incorporated, Troy, Mich.

[22] Filed: Nov. 25, 1970

[21] Appl. No.: 92,750

[52] U.S. Cl. .............. 408/76, 408/108, 408/109, 408/234
[51] Int. Cl. ............................. B23b 45/14
[58] Field of Search ....... 408/76, 103, 88, 108, 109, 408/234

[56] References Cited
UNITED STATES PATENTS

| 475,158 | 5/1892 | Sharp | 408/103 X |
| 834,605 | 10/1906 | Cahill | 408/103 X |
| 957,897 | 5/1910 | Neubert | 408/76 |
| 1,023,921 | 4/1912 | Brown | 408/76 |
| 1,698,068 | 1/1929 | Ranney | 408/103 X |
| 2,622,457 | 12/1952 | Buck | 408/76 |
| 3,044,324 | 7/1962 | Buck | 408/76 |
| 3,254,547 | 6/1966 | Engelsted et al. | 408/76 |
| 3,371,257 | 2/1968 | Warren et al. | 318/39 |
| 3,500,707 | 3/1970 | Warren | 408/135 |
| 3,362,447 | 1/1968 | Elder | 408/109 |

FOREIGN PATENTS OR APPLICATIONS

| 991,160 | 5/1965 | Great Britain | 408/76 |
| 1,260,818 | 4/1961 | France | 408/76 |
| 277,394 | 12/1951 | Switzerland | 408/88 |

*Primary Examiner*—Francis S. Husar
*Attorney, Agent, or Firm*—Harness, Dickey and Pierce

[57] ABSTRACT

A base has means by which it is attached to a workpiece to be drilled with one portion of a dovetail slide thereon which cooperates with the other portion of the dovetail slide on the frame which supports the drill unit. After the base is secured on the workpiece, the frame and drill unit may be moved forwardly or rearwardly along a longitudinal plane. The base may be provided with a pivoted section which has the one portion of the dovetail thereon so that after the base is clamped to the workpiece, the drill point may not only be adjusted longitudinally but also sidewardly so that it may be located exactly over the point at which drilling is to occur. This permits the base element to be attached to the workpiece with the drill point in approximate position or adjacent to a plurality of positions after which it may be located over the point or points on the workpiece at which drilling is to occur.

8 Claims, 13 Drawing Figures

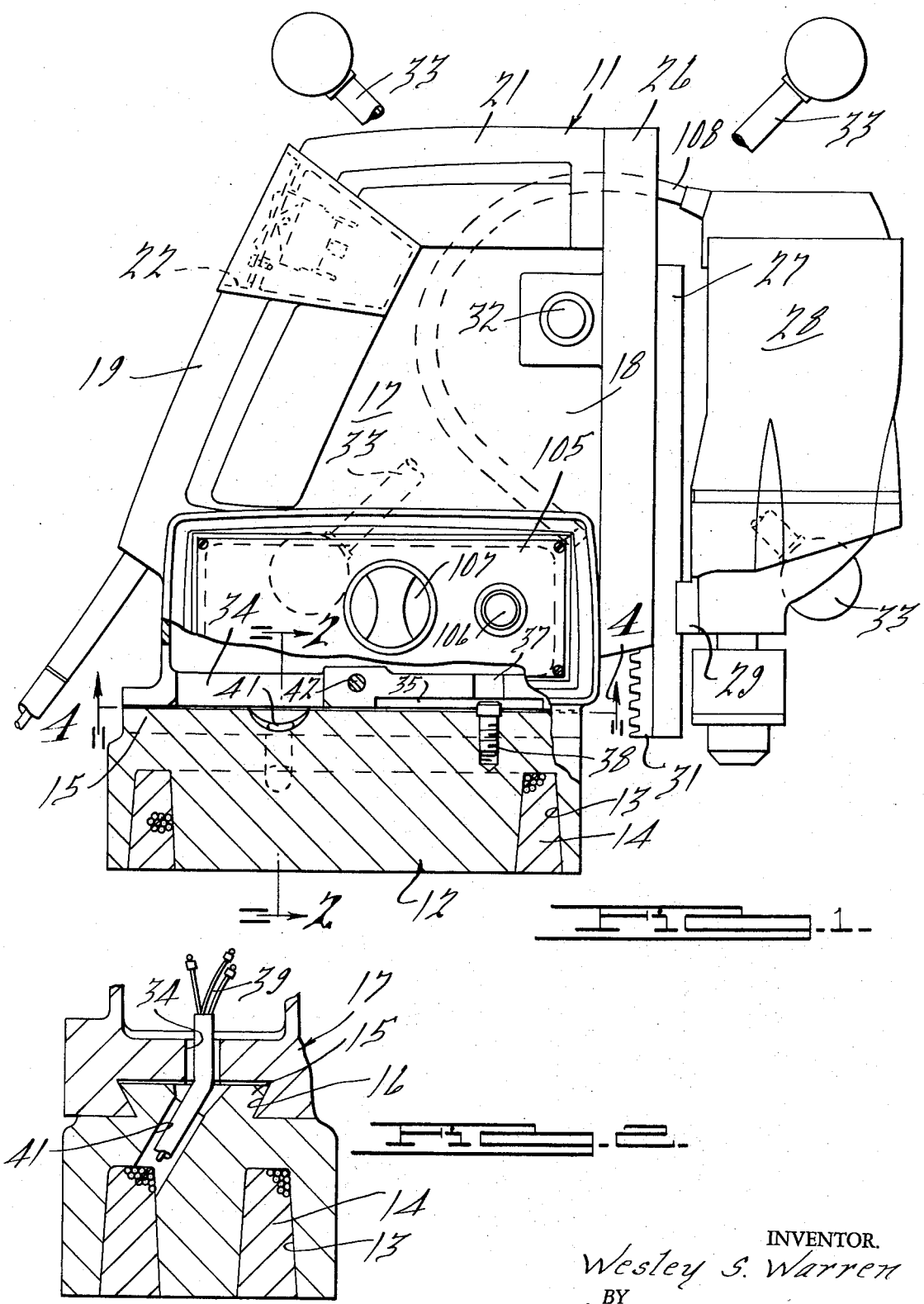

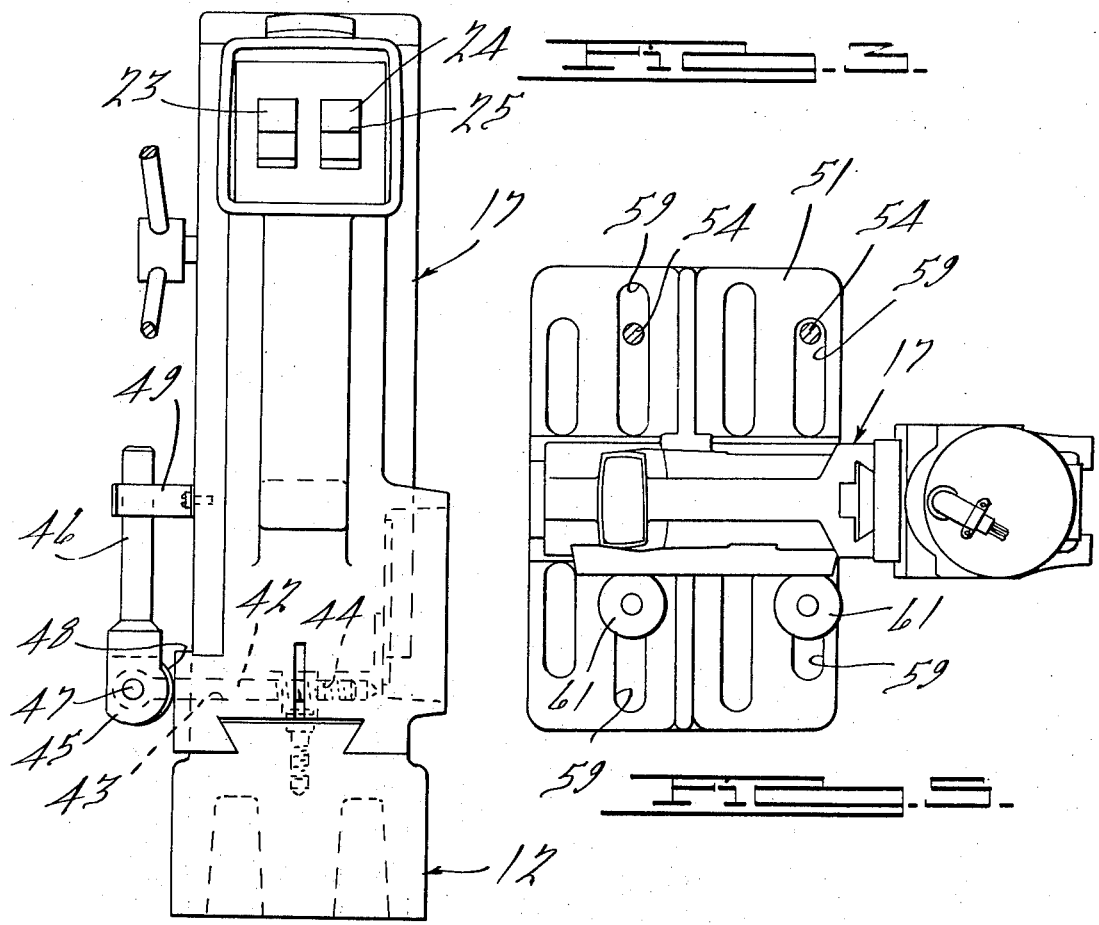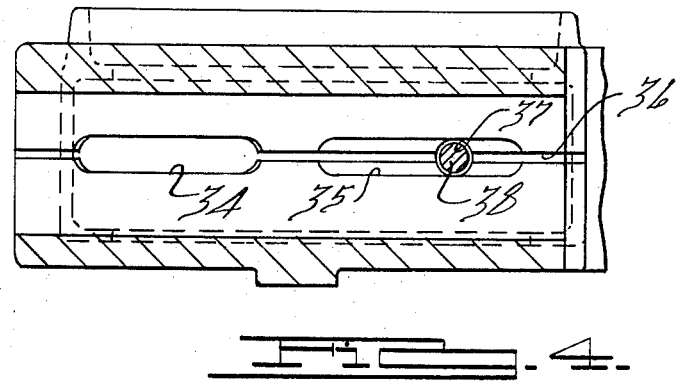

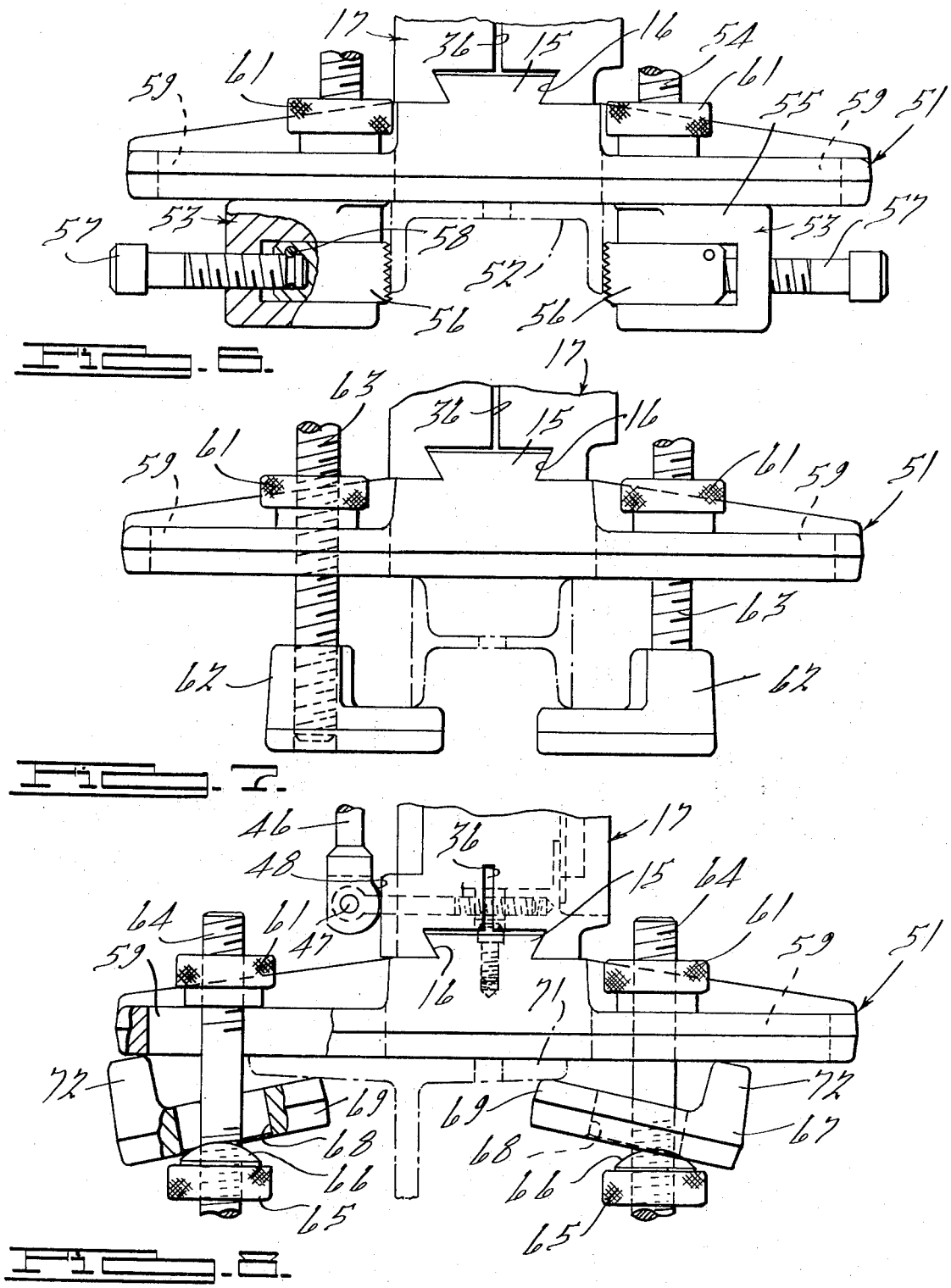

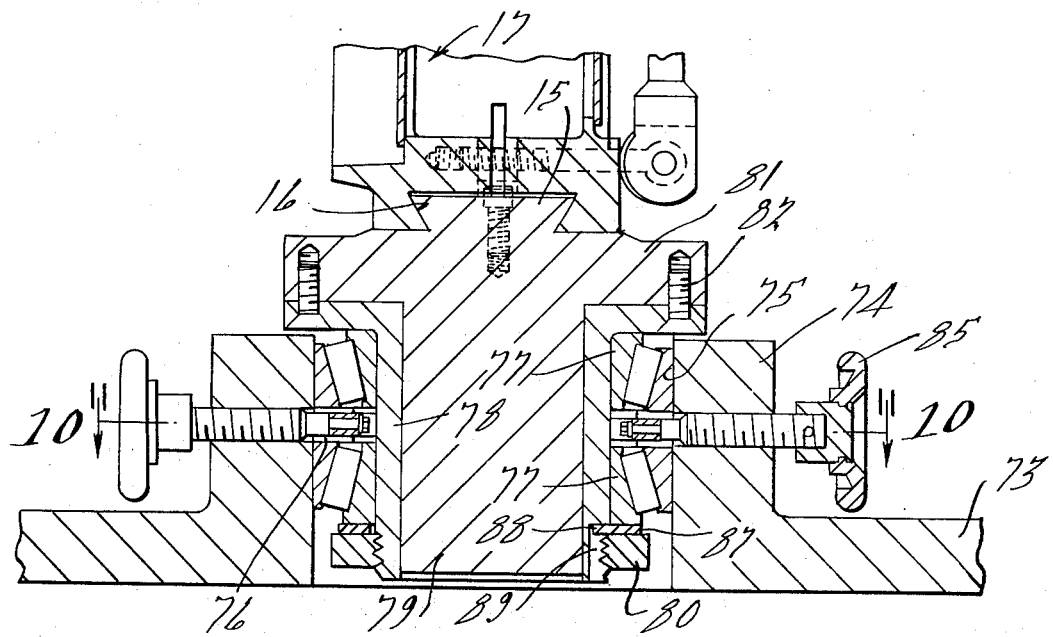
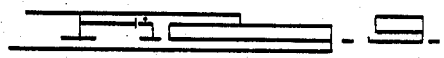
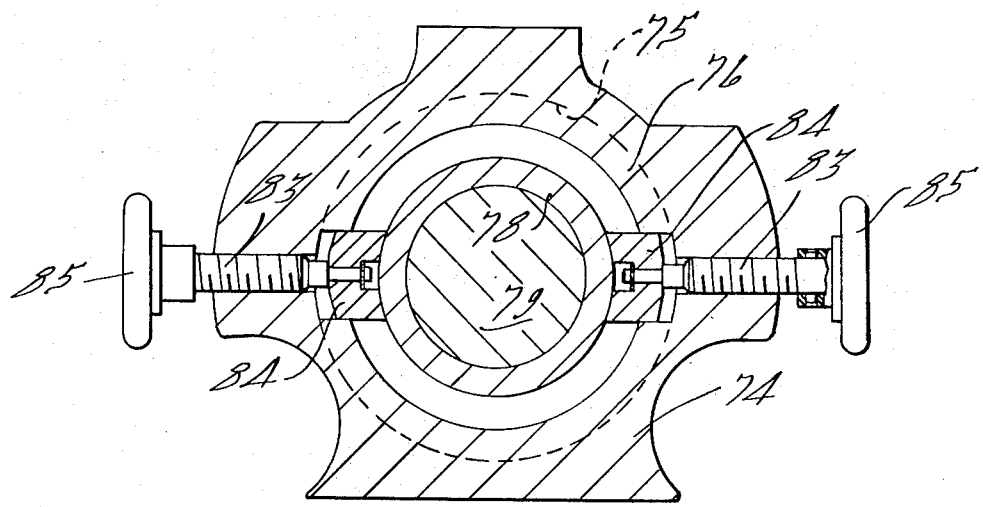
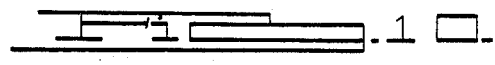
INVENTOR.
Wesley S. Warren

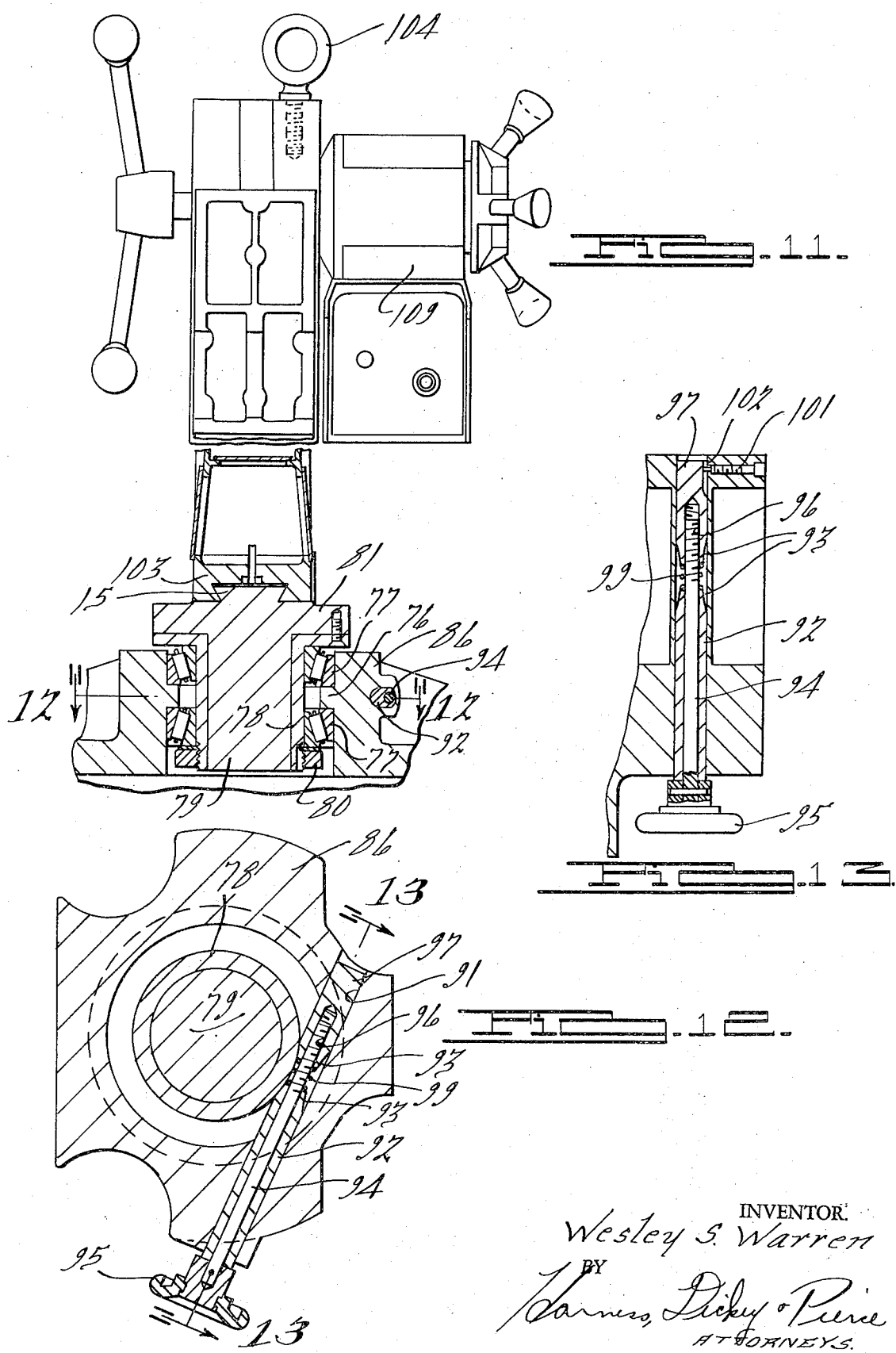

3,791,755

ADJUSTABLE DRILL ON ATTACHABLE BASE

BACKGROUND OF THE INVENTION

Reference may be had to W. S. Warren, U.S. Pat. Nos. 3,371,257 and 3,500,707 to show the drilling art of employing a magnetic base for attachment to a workpiece which supports the drill unit in position for drilling a hole.

SUMMARY OF THE INVENTION

The invention pertains to a portable drill unit having a base attachable to a workpiece which contains one portion of a dovetail slide. A frame which supports a motor driven drill in a manner to perform a drilling operation has the other portion of the dovetail slide thereon which permits the drill to be advanced or retracted relative to the attached base for accurately locating the drill point before the drilling operation. Clamping means is provided for locking the drill supporting frame to the secured base after adjustment thereon. The drill supporting frame has a handle portion in which a pair of switches is located for controlling the current to the base when using the flux from a magnetic coil as the supporting medium. In place of the magnetic coil, a clampable plate is employed having the one portion of the dovetail slide thereon with various types of clamping elements adjustably supported on the plate for engaging and securing the plate to a workpiece. This is desirable when the workpiece is of thin construction or is made of non-magnetic material where sufficient magnetic holding force would not be obtainable. The plate or magnetic base may have a rotary element on which the one member of the dovetail is mounted with clamping means therefor so that the point of the drill may be adjusted over a substantial area longitudinally and sidewardly to accurately locate the point of the drill over the point or a plurality of points at which drilling is to occur during one securement of the plate or magnetic base to the workpiece. In this arrangement, a drilling unit may be supported by the dovetail on the rotary element of the attachable base and be provided with a motor driving feed unit for the drill which advances the drill into the workpiece at a predetermined speed. Such portable drill units are similar to those of the above mentioned two patents.

BRIEF DESCRIPTION OF THE DRAWINGS

FIG. 1 is a view in elevation with parts broken away and in section of an adjustable drill unit mounted on an attachable base embodying features of the present invention;

FIG. 2 is an enlarged sectional view of the structure illustrated in FIG. 1, taken on the line 2—2 thereof;

FIG. 3 is a view of the structure illustrated in FIG. 1, as viewed from the lefthand side thereof;

FIG. 4 is a sectional view of the structure illustrated in FIG. 1, taken on the line 4—4 thereof;

FIG. 5 is a plan view of structure, similar to that illustrated in FIG. 1, mounted on an attachable base of the clampable type;

FIG. 6 is an enlarged broken view of the structure illustrated in FIG. 5, as viewed from the lefthand side thereof showing one form of clamping means for attaching the base to a workpiece;

FIG. 7 is a view of the structure illustrated in FIG. 6 showing a further form of clamping means for attaching the base to a workpiece;

FIG. 8 is a view of the supporting structure illustrated in FIGS. 6 and 7 showing a still further form of clamping means for attaching the base to a workpiece;

FIG. 9 is a broken sectional view of the structure illustrated in FIGS. 5 to 8 showing the attachable base provided with a central rotatable element having one member of the dovetail thereon;

FIG. 10 is a sectional view of the structure illustrated in FIG. 9, taken on the line 10—10 thereof;

FIG. 11 is a view of structure, similar to that illustrated in FIG. 9, having a portalbe drilling unit thereon provided with feed means for advancing the drill into the workpiece;

FIG. 12 is an enlarged broken sectional view of the structure illustrated in FIG. 11, taken on the line 12—12, and FIG. 13 is a sectional view of the structure illustrated in FIG. 12, taken on the line 13—13 thereof.

DESCRIPTION OF THE PREFERRED EMBODIMENTS

In FIGS. 1 to 4, a drill unit 11 is illustrated having a magnetic base 12 of conventional form by which the unit is secured to a workpiece to be drilled reamed, countersunk or otherwise machined. The base 12 is made of magnetizable iron having a rectangular slot 13 therein in which a coil of wire 14 is secured. The base has a slideway embodying a male dovetail slide portion 15 which receives a female dovetail slide portion 16 provided in the bottom edge of a cast frame 17 which may be made of the same or a lighter material than that of the magnetic base 12. The frame 17 has a hollow central section 18 from which rear and top handle portions 19 and 21 are spaced and by which the unit can be lifted and applied to a workpiece. On the upper section of the handle portion 19 adjacent to the handle portion 21 a switch receiving recess 22 is provided. Switch means having tiltable actuating fingers 23 and 24 provided with an "off" central position 25 is mounted within the recess 22. When the upper portion of the finger 23 is moved inwardly, low magnetism is produced by the base 12. When the upper portion of the finger 24 is moved inwardly, a medium magnetism is provided by the base 12. When the bottom portion of the finger 24 is moved inwardly, a high magnetism is produced by the base 12. When the bottom of the finger 23 is moved inwardly, a demagnetism of the base 12 occurs.

The forward edge of the frame 17 is disposed at has a right angle to the bottom edge of the dovetail slide way 26 which supports the mail dovetail slide 27 to which a motor driven drill unit 28 is secured. The drill unit 28 has a web portion 29 recessed in the face of the dovetail slide 27 and is fixed thereto by a plurality of screws (not shown) in the conventional manner. The slide 27 carries a rack 31 which is engaged by a pinion on a shaft 32 operated by a plurality of handle elements 33, herein illustrated as four in number. Upon the rotation of the shaft 32, the drill unit 28 is moved toward and away from the workpiece in the normal manner. The base of the frame 17 containing the female dovetail slide portion 16, as illustrated in FIG. 4, has a slot 34 in the lefthand portion and a similarly shaped recess 35 in the right-hand portion. A slot 36 passes through both ends of the base portion of the frame 17 and the recess 35. The base of the recess 35 has an aperture 37 through which a screw 38 passes when screwed into the base 12, as illustrated in FIG. 1, for limiting the forward and rearward movement of the frame 17 on the base 12. A conduit containing a control wire 39 for the magnetic coil 14 extends upwardly through an aperture 41 in the base 12 and dovetail portion 15 and through the slot 34 which permits the frame 17 to be moved on the dovetail portion 15 forwardly and rearwardly thereon.

An eye bolt 42 extends into an aperture 43 in the frame 17 on one side of the slot 36 into a threaded aperture 44 in the frame at the other side of the slot. The eye of the bolt extends into the slot in the bifurcated head 45 of a lever 46 to which it is secured by a pivot 47. After the eye bolt has been screwed a predetermined distance into the aperture 44, the swinging of the lever 46 clockwise into engagement with a U-shaped locking element 49 will move a cam face 48 on the head 45 into engagement with the frame 17 and draw the portions of the frame 17 on opposite sides of the slot 36 toward each other to clamp the female dovetail portion 16 to the male portion 15 after the frame 17 has been adjusted on the base 12. After the drill unit has been applied to a workpiece and located thereon with the center aligned with the point where the hole is to be drilled, the frame 17 may be adjusted forward or rearwardly on the base to locate the drill point thereover.

In FIGS. 5 to 8, the frame 17 is illustrated as being supported on the male dovetail portion 15 of a plate 51 having clamping elements thereon by which the plate is secured to the workpiece. As illustrated in FIGS. 6, 7 and 8, the plate 51 has the male dovetail portion 15 in the center thereof engaged by the female dovetail 16 in the base of the frame 17. The plate is used when the workpiece to be drilled is not of the magnetic type or the thickness of the metal is such that a sufficiently strong magnetic force can not be provided to assure the retention of the magnetic base 12 thereon.

In FIG. 6, the plate 51 is illustrated as being secured to a channel workpiece 52 by like clamps 53. The clamps have a threaded stud 54 extending from a U-shaped head 55 in which toothed jaws 56 are slidable toward and away from the flanges of the channel workpiece 52 by screws 57 pivotally secured to the jaws by a pin 58. The studs 54 extend through slots 59 of different length and locations through the plate and are secured thereto by nuts 61. The studs 54 are adjusted to have the jaws located adjacent to the flanges of the workpiece 52 after which the screws 57 are advanced to force the teeth of the jaws 56 into the metal of the flanges to retain the plate 51 on the workpiece. In FIG. 7, L-shaped feet 62 on studs 63 engage the bottom of the flanges of an eye-beam and clamp the plate 51 thereto when the nuts 61 are tightened.

In FIG. 8, studs 64 extend through apertures 59 in the plate 51 with nuts 65 on the bottom provided with a truncated spherical face 66 which engages L-shaped clamping elements 67 through which the studs 64 extend. A slot 68 in the elements 67 permits the fore and aft adjustment thereof on the stud 64 so that an end 69 can be forced into engagement with a flange 71 of an eye-beam when the end 72 is forced against the bottom of the plate 51 upon the final tightening of the nuts 61. From the various arrangements of FIGS. 6, 7 and 8, it can be seen that the plate 51 can be clamped by various types of clamping elements to different shaped workpieces so that holes may be drilled therein.

Referring to FIGS. 9 and 10, a clamping plate 73 having the slots 59 therein has the central portion provided with an upstanding boss 74 containing a cylindrical aperture 75 and an inwardly extending annular rib 76. A pair of bearings 77 are secured against the rib 76 when engaging a flanged sleeve 78 having a threaded end on which a nut 80 is screwed. A cylindrical boss 79 having a flange 81 is secured to the flange of the sleeve 78 by a plurality of screws 82. The flange 81 which is of rectangular form carries the male dovetail portion 15 on which the dovetail portion 16 in the base of the frame 17 is slidably adjusted. The upstanding boss 74 has manually actuatable screws 83 threaded therein in aligned relation and secured to brake shoe-like plates 84 which engages the outer surface of the sleeve 78 and clamp it against rotation when advanced by the screws 83 there-against. Upon the retraction of the screws upon the reverse turning of the handles 85 provided thereon, the plates 84 are retracted permitting the sleeve 78 to be rotated to thereby angularly adjust the frame 17 in addition to its adjustment along the dovetail portion 15. With this arrangement, the point of the drill, after the unit is secured to a workpiece by magnetic or mechanical means, may not only be adjusted outwardly or inwardly relative thereto but also sidewardly so that aligned or unaligned apertures may be drilled in the workpiece without requiring the resetting of the attachable base for each aperture drilled.

Referring to FIGS. 11, 12 and 13, a plate 86 which is similar to the plate 73 has the bearings 77 mounted on the flange 76 for supporting the sleeve 78 and boss 79. The nut 80 is threaded on the end of the sleeve 78 against a washer 87 having an inwardly extending finger 88 disposed in a slot 89 which prevents the washer and nut from turning when the sleeve is rotated. The plate 86 has a cylindrical aperture 91 therein containing a cylindrical sleeve 92 having an arcuate end 93 through which a screw 94 on a handle 95 extends having the threaded end engaged in a threaded aperture 96 in a cylindrical element 97 also having an arcuate end portion 93. The adjacent arcuate end portions engage the outer cylindrical surface of the sleeve 78 when the two cylindrical elements 92 and 97 are drawn toward each other by the operation of the handle 95. A spring 99 urges the elements 92 and 97 apart when the handle is turned in the opposite direction to release the sleeve 78. A set screw 101 has an end extending into a slot 102 in the cylindrical element 97 to prevent it from rotating when the screw 94 is turned therein. The dovetail element 15 on the rectangular flange 81 is engaged by the dovetail in a frame 103 which is of a type illustrated in U.S. Pat. No. 3,500,707 having a motor driven feed attachment 109 for the drill. This larger and heavier unit is shown on the clamping plate 86 but it is to be understood that the clamping plates and magnetic base are interchangeable so that the rotatable mount for the dovetail 15 may be applied to the cylindrical or rectangular magnetic base in the same manner as illustrated herein as being applied to the clamping plate. While the boss 79 and its dovetail slide portion 15 have been illustrated and described relative to the plates 73 and 86, it is to be understood that they are also applicable to a rectangular or round magnetic base as shown in the above mentioned patents.

It will be noted that an eye bolt 104 is provided at the top of the frame 103 of the drilling device of FIG. 11 to permit the heavy unit to be positioned by a block and fall, crane or the like. The drilling unit has not been described in any great detail as it follows the construction of the above mentioned patents. A control panel 105 on the side of the frame 17, as illustrated in FIG. 1, contains a dial 106 for controlling the speed of the motor and a dial 107 for controlling its "Off," "Forward," and "Reverse" positions. The wires 39 of the magnetic coil are connected to the switch means having the toggle fingers 23 and 24 and a conductor 108 is connected to the drill unit 28 and to the source of power therefor controlled by the dials 106 and 107. The novelty of the present invention is the provision of holding means for a portable type of drill unit which permits the adjustment of the drill point to different positions after the unit is anchored to the workpiece.

I claim:

1. In a portable drill device, a frame having a vertical elongated edge at the front face and a horizontal elongated edge at the bottom face, said edges being disposed at right angle to each other at the front and bottom corner of the frame in L-relation, support means, dovetail-like ways interconnecting the support means and bottom elongated edge for movement of the frame forwardly and rearwardly on the support means, slide means, dovetail-like ways interconnecting the slide means and the vertical elongated edge of said frame, and a motor having means thereon for supporting a tool secured to said slide means for movement vertically on the frame.

2. In a portable drill device as recited in claim 1, wherein said dovetail support means are of like dimensions in cross section.

3. In a portable drill device as recited in claim 1, wherein said support means has magnetic coil means therein for securing the base on a workpiece.

4. In a portable drill device as recited in claim 1, wherein said support means is a plate-like element which engages the workpiece on the side to be drilled, and clamping means on the opposite ends of the element securable to the opposite side of the workpiece from that to be drilled for maintaining the element in fixed relation thereto.

5. In a portable drill device as recited in claim 1, wherein said support means is mounted on a rotary element for angular adjustment.

6. In a portable drill device as recited in claim 1, wherein clamp means is provided on said frame for locking it on the support means after adjustment relative thereto.

7. In a portable drill device as recited in claim 5, wherein clamp means is provided for securing said rotary element in angular adjusted position.

8. In a portable drill device as recited in claim 3, wherein said frame is provided with handle means, and switch means on said handle means for controlling the magnetism of said base.

* * * * *